UNITED STATES PATENT OFFICE.

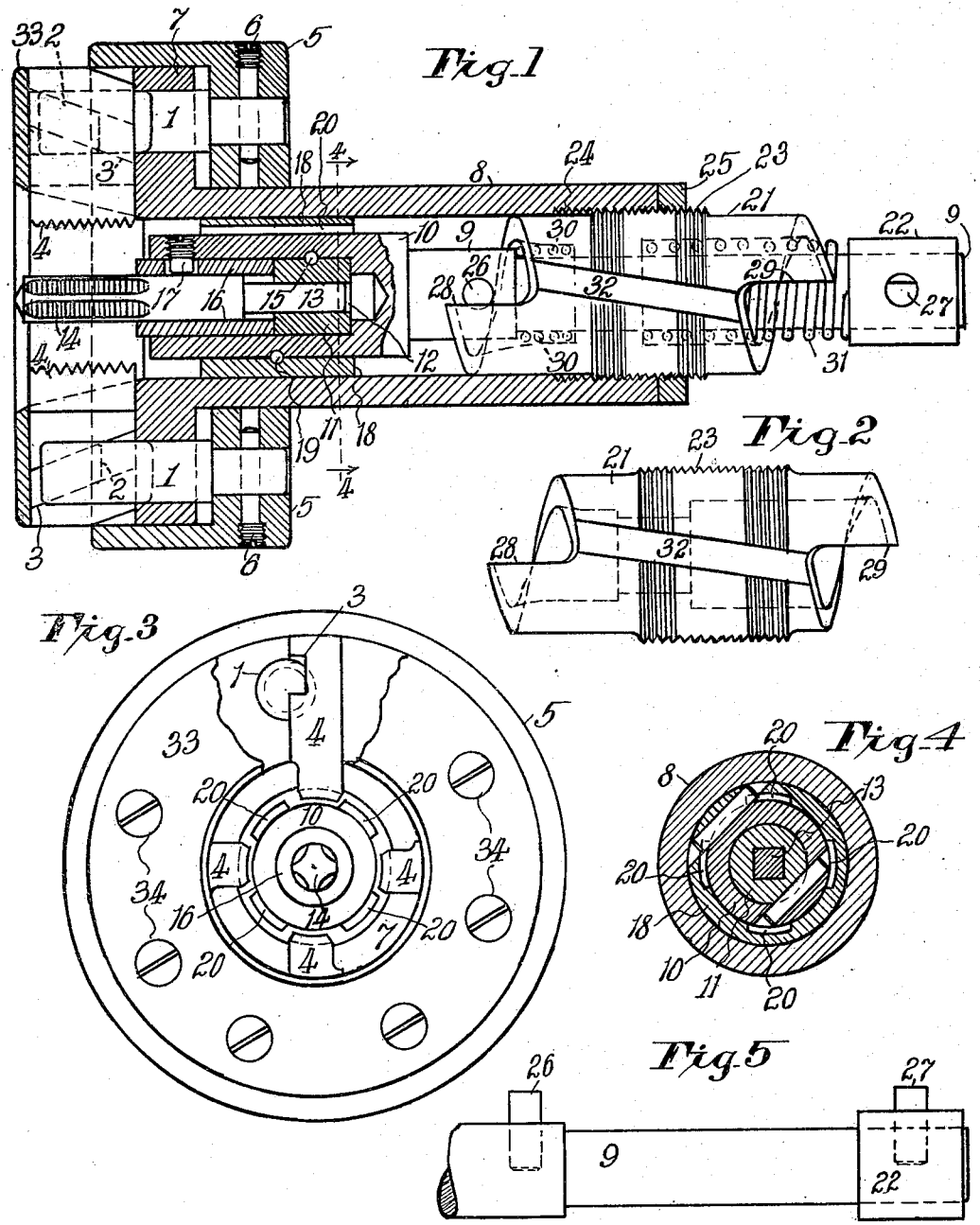
W. H. GATES.
TAPPING MECHANISM FOR DIE HEADS.
APPLICATION FILED SEPT. 10, 1915.
1,188,437.
Patented June 27, 1916.

WILLIAM H. GATES, OF NEW HAVEN, CONNECTICUT.

TAPPING MECHANISM FOR DIE-HEADS.

1,188,437.

Specification of Letters Patent. Patented June 27, 1916.

Application filed September 10, 1915. Serial No. 49,898.

*To all whom it may concern:*

Be it known that I, WILLIAM H. GATES, citizen of the United States, residing at New Haven, in the county of New Haven and State of Connecticut, have invented certain new and useful Improvements in Tapping Mechanism for Die-Heads; and I do hereby declare the following to be a full, clear and exact description of the invention, such as will enable others skilled in the art to which it appertains to make and use the same.

My invention relates to a combination tap and die head.

Referring to the drawings—

Figure 1 represents a central sectional view of the die head and a broken sectional view of the tap mechanism; Fig. 2 is a detail view of the tapping spindle driving member adapted to be carried by the die head; Fig. 3 is a broken front elevation of the combined tool; Fig. 4 is a sectional view on line 4 of Fig. 1; and Fig. 5 is a detail broken view of the shank of the tapping spindle.

The tap mechanism can be applied to any form of adjustable die head carrying threading dies having a radial movement. In my present construction I have shown the tap mechanism applied to a die head wherein the dies are actuated to open and close in the same manner as shown in the patent granted to me on August 3, 1915, No. 1,148,510, viz.: through the medium of the cam studs 1 having cam projections 2 on their outer end to register with the cam grooves 3 formed in the face of the threading dies 4. These studs are carried by the sliding shell 5 and are secured thereto by the pins 6, said studs passing freely through holes formed in the part 7 of the die head. The head extension or shank 8 is adapted to enter a movable turret head—not shown—and is partially embraced by said shell. The mechanism for actuating the sliding shell to open and close the dies, and lock the shell to the head and unlock the same is not shown, as it forms no part of my present invention.

The tap mechanism comprises the spindle 9 having the head 10 in the mouth of which is located the tap holding bushing 11 having the angular hole 12 to receive the angular shank 13 of the tap 14.

15 is a pin for securing the bushing to the spindle head, and 16 is the tap supporting bushing secured to the spindle head by the screw 17.

18 is an outer bushing journaled in the bore of the shank 8 and is secured to the spindle head by the pin 19. 20 are oil grooves formed through said bushing through which oil is forced to the tap.

The hollow clutch sleeve 21 freely embraces the spindle shank 9 and the collar 22 located on the end of said spindle, and it has the external central threaded portion 23 adapted to adjustably register with the internal thread 24 of the shank 8 of the die carrying head for the purpose of adjusting the position of the tapping spindle and is secured in any of its adjusted positions by the jam nut 25. The spindle shank and collar 22 are provided with the clutch pins 26, 27 adapted to be engaged by the clutch faces 28, 29 for the purpose presently to be described.

As shown in Fig. 1, the tool has been advanced by a turret head—not shown—and is brought close to the work—not shown—having a central hole adapted to be threaded by the tap. The pressure of the tap against the mouth of the hole in the work will store up sufficient tension in the spring 30 as will cause the tap to take hold simultaneously with the threading dies. The die head and tap rotate faster than the work when cutting and in the same direction. While the dies are engaged with the work, the tap is moving forward independently of the die head until the clutch pin 26 runs off from the face 28 of the clutch, when the further inward movement of the tap will cease, and when the dies have finished cutting, they will automatically open and the die head will be slowed down and retreated until the clutch face 29 engages the rear clutch pin 27. The clutch sleeve is provided with oil grooves adapted to admit oil to the bore of the shank 8, one of said grooves or channels, 32, is shown in Figs. 1 and 2.

33 is the front plate of the die head inclosing the threading dies and is maintained in place by the screws 34.

Having thus described my invention, what I claim is:—

1. In combination, a die head carrying externally threading dies, a tapping spindle located within the head and having an independent longitudinal movement therein, a driving member carried by the head, and means on the spindle adapted to be engaged by said driving member to rotate the spindle with the head.

2. In combination, a die head carrying externally threading dies, a tapping spindle located within the head and having an independent longitudinal movement therein, an adjustable driving member carried by the head, and means on the spindle adapted to be engaged by said driving member to rotate the spindle with the head.

3. In combination, a die head carrying externally threading dies, a tapping spindle located within the head and having independent longitudinal movement therein, an adjustable driving member carried by the head, means on the spindle to be engaged by said member to rotate the spindle with the head when the tap is engaged with the work, and at a lower rate of speed when the tap is withdrawing from the work.

4. In combination, a die head carrying externally threading dies adapted to automatically open and close, internal tapping mechanism carried by the head and adapted to be rotated by the head and also have an independent longitudinal movement therein.

5. In combination, a die head carrying externally threading dies adapted to automatically open and close, internal tapping mechanism having an independent longitudinal movement both when the threading dies are closed and opened, and means carried by the head to impart a rotary motion to the tapping mechanism.

6. In combination, a die head carrying externally threading dies adapted to automatically open and close, internal tapping mechanism comprising a tap carrying spindle having an independent longitudinal movement, a clutch sleeve carried by the head and embracing the spindle, means carried by the spindle to be engaged by the clutch sleeve to rotate said spindle with the head.

7. In combination, a die head carrying externally threading dies, internal tapping mechanism having an independent longitudinal movement therein, and clutch mechanism carried by the head and tapping mechanism to actuate the rotary movement of the tapping mechanism.

8. In combination, a die head carrying externally threading dies adapted to automatically open and close, internal tapping mechanism comprising a tap carrying spindle having an independent longitudinal movement in the head, a clutch sleeve carried by the head and embracing the spindle, means on the spindle to be engaged by the clutch sleeve to rotate said spindle with the head, a stored up tension spring adapted to exert sufficient force to cause the tap to engage with the work, and a stored up tension spring to return the spindle after the tap has been released from the work.

9. A die head carrying externally threading dies, a tap carrying spindle within the head and having an independent longitudinal movement therein, a driving member carried by the head, means on the spindle to be engaged by said member to rotate the spindle with the head, said spindle having an open mouth, and a tap holding and a tap supporting bushing located in said mouth.

In testimony whereof I affix my signature in presence of two witnesses.

WILLIAM H. GATES.

Witnesses:
JOHN C. EVANS,
THEO. E. HOPPER.